Feb. 9, 1965 J. P. JOHANNIGMAN 3,168,759
CORE PUNCH AND BOTTOM STOP THEREFOR
Filed Jan. 17, 1963 5 Sheets-Sheet 1

INVENTOR.
JEROME PAUL JOHANNIGMAN,
BY
ATTORNEYS.

Feb. 9, 1965  J. P. JOHANNIGMAN  3,168,759
CORE PUNCH AND BOTTOM STOP THEREFOR
Filed Jan. 17, 1963  5 Sheets-Sheet 3

INVENTOR.
JEROME PAUL JOHANNIGMAN,
BY

ATTORNEYS.

Feb. 9, 1965  J. P. JOHANNIGMAN  3,168,759
CORE PUNCH AND BOTTOM STOP THEREFOR
Filed Jan. 17, 1963  5 Sheets-Sheet 4
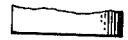  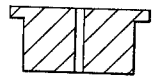
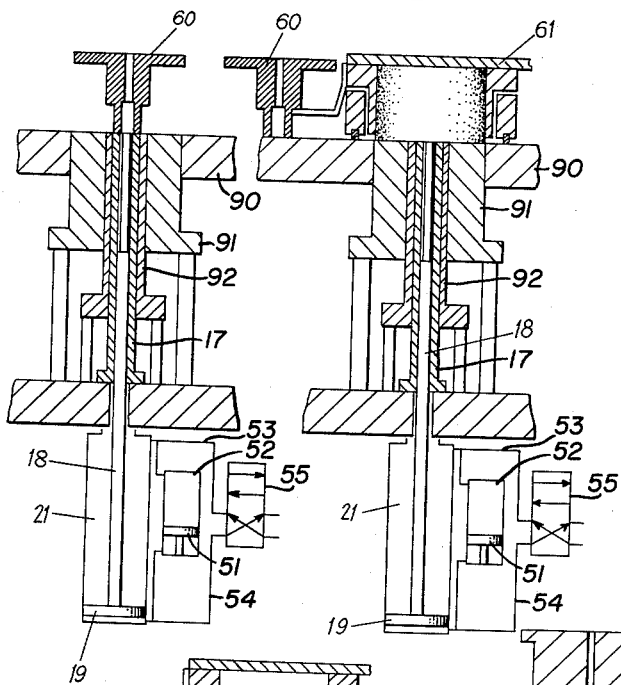
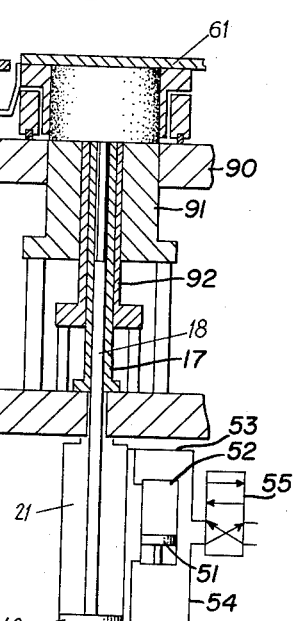
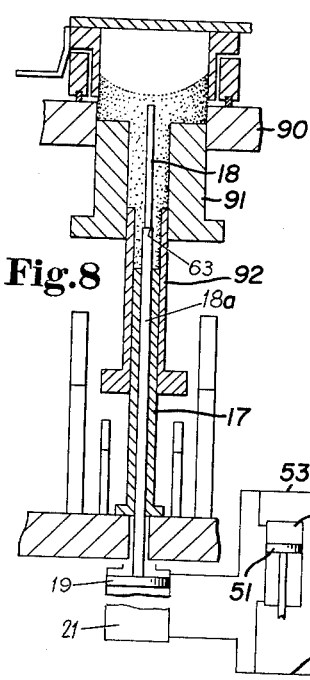
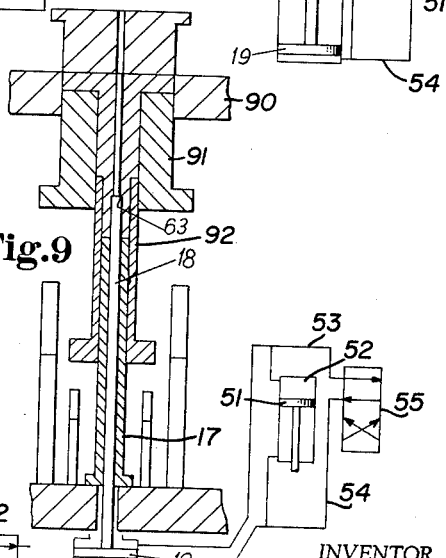
INVENTOR.
JEROME PAUL JOHANNIGMAN,
BY
ATTORNEYS.

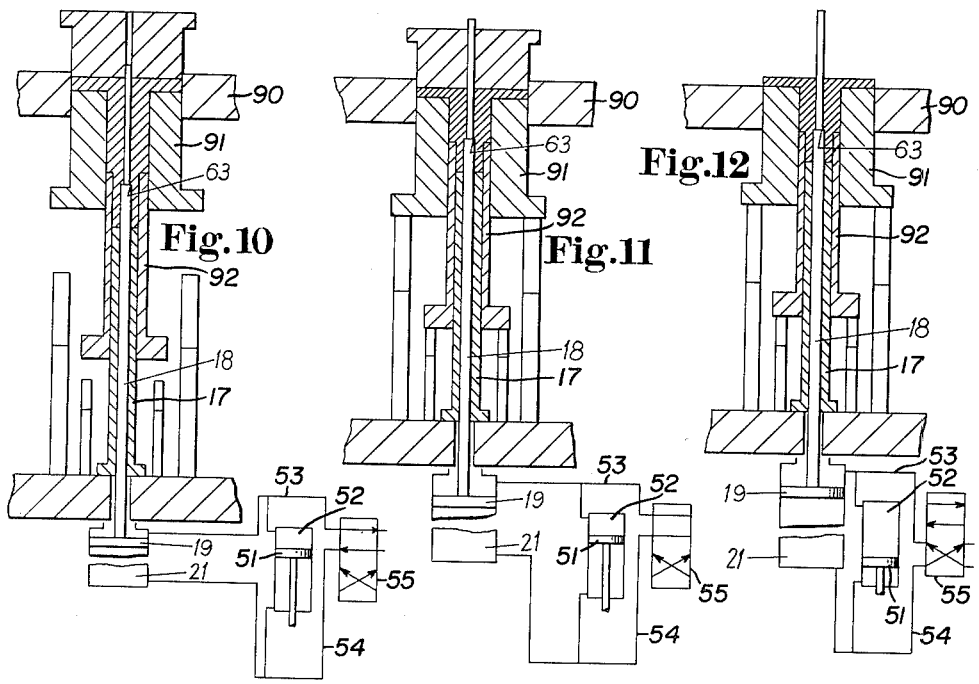
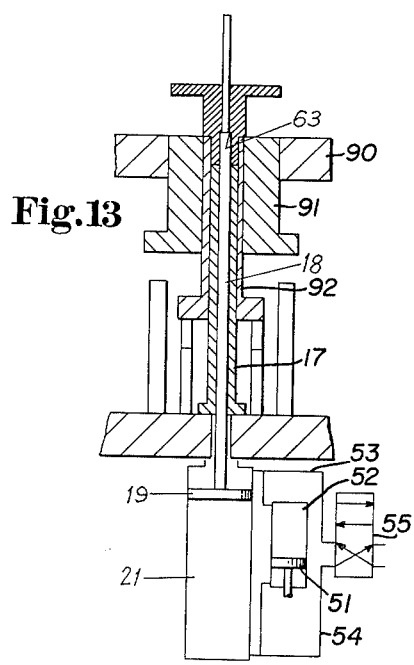
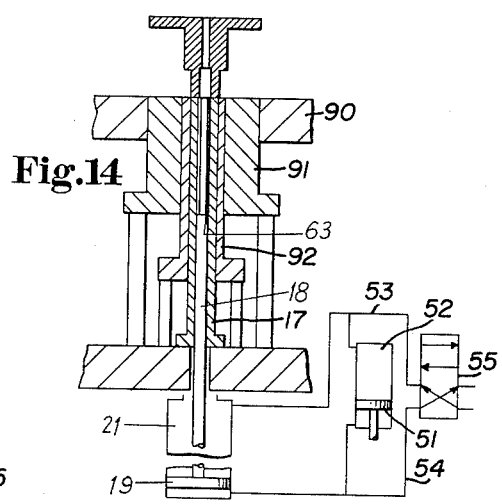
INVENTOR.
JEROME PAUL JOHANNIGMAN,
ATTORNEYS.

United States Patent Office 3,168,759
Patented Feb. 9, 1965

3,168,759
CORE PUNCH AND BOTTOM STOP THEREFOR
Jerome Paul Johannigman, St. Louis, Mo., assignor to The Cincinnati Shaper Company, Cincinnati, Ohio, a corporation of Ohio
Filed Jan. 17, 1963, Ser. No. 252,154
5 Claims. (Cl. 18—16.7)

This invention relates to compacting presses wherein powdered material is compacted into cohesive solid form by means of a punch operating in mold or die cavities. Such machines are used in the manufacture of metal objects wherein metal powder is highly compacted into a desired configuration and thereafter sintered to form a homogeneous metallic object. Where the workpiece to be manufactured is provided with a hole, a so-called core rod or core punch is provided to determine the internal configuration of the workpiece. In present day practice, the dies in which the workpiece is compacted are generally arranged so as to float downwardly during the compacting operation as a result of the pressure of the material being compacted and as a result of friction between the metal being compacted and the walls of the various die cavities. Similarly, the core punch may be arranged to float downwardly a small amount. However, in order to determine the final position of the core punch at the completion of the compacting operation, it is necessary to provide a bottom stop. This bottom stop must be capable of being released so that the core punch may be ejected or withdrawn from the workpiece. The core punch is preferably withdrawn or ejected at or about the time that all the external steps of the workpiece have been ejected from the respective die cavities. It will be understood that the question of a bottom stop for the core punch becomes of great importance where the bore in the workpiece is required to have a step or shoulder and the location of such shoulder must be accurately determined.

A typical machine with which the apparatus of the present invention may be used is disclosed in the copending application of Byron B. Belden, Serial No. 221,840, filed September 6, 1962. In said application a core punch is designated at 18 and is shown as being operated by a piston 19. These same numerals will be used herein.

It is an object of the present invention to provide a bottom stop for a core punch which will transmit the thrust on a core punch to the frame of the apparatus but which stop may be moved aside at the proper point in the compacting cycle to permit withdrawal or ejection of the core punch from the workpiece. It is another object of the invention to provide adjusting means for the stop whereby the position of any particular configuration of the core punch with respect to the completely compacted article may be accurately determined. It is another object of the invention to provide means for resetting the bottom stop into its operative position.

These and other objects of the invention which will be described in more detail hereinafter or which will become apparent as the description proceeds are accomplished by that certain construction and arrangement of parts of which the following is a description of an exemplary embodiment.

Reference is made to the drawings forming a part hereof and in which.

FIGS. 5 to 14 inclusive are diagrammatic views in cross-section showing the relationship of parts during compacting and ejecting operation.

Briefly, in the practice of the invention there is provided a segmented ring against which the bottom of the core punch can bear and which serves as the bottom stop. The ring is supported by an annular shoulder in an adjustable member. The mutually opposed faces of the segments of the ring slope toward each other downwardly to provide upwardly facing V-shaped notches and from each of the mutually opposed faces a horizontal pin extends into the notch. The several segments of the stop ring are forced apart by a number of wedge blocks having faces cooperating with the inclined faces of the segments to force the segments radially outwardly. The wedge blocks are provided with internally directed cam surfaces which may engage under the extending pins referred to above so that upon withdrawal of the wedge blocks, the several segments of the ring are cammed inwardly toward each other to operative position.

Figure 2:
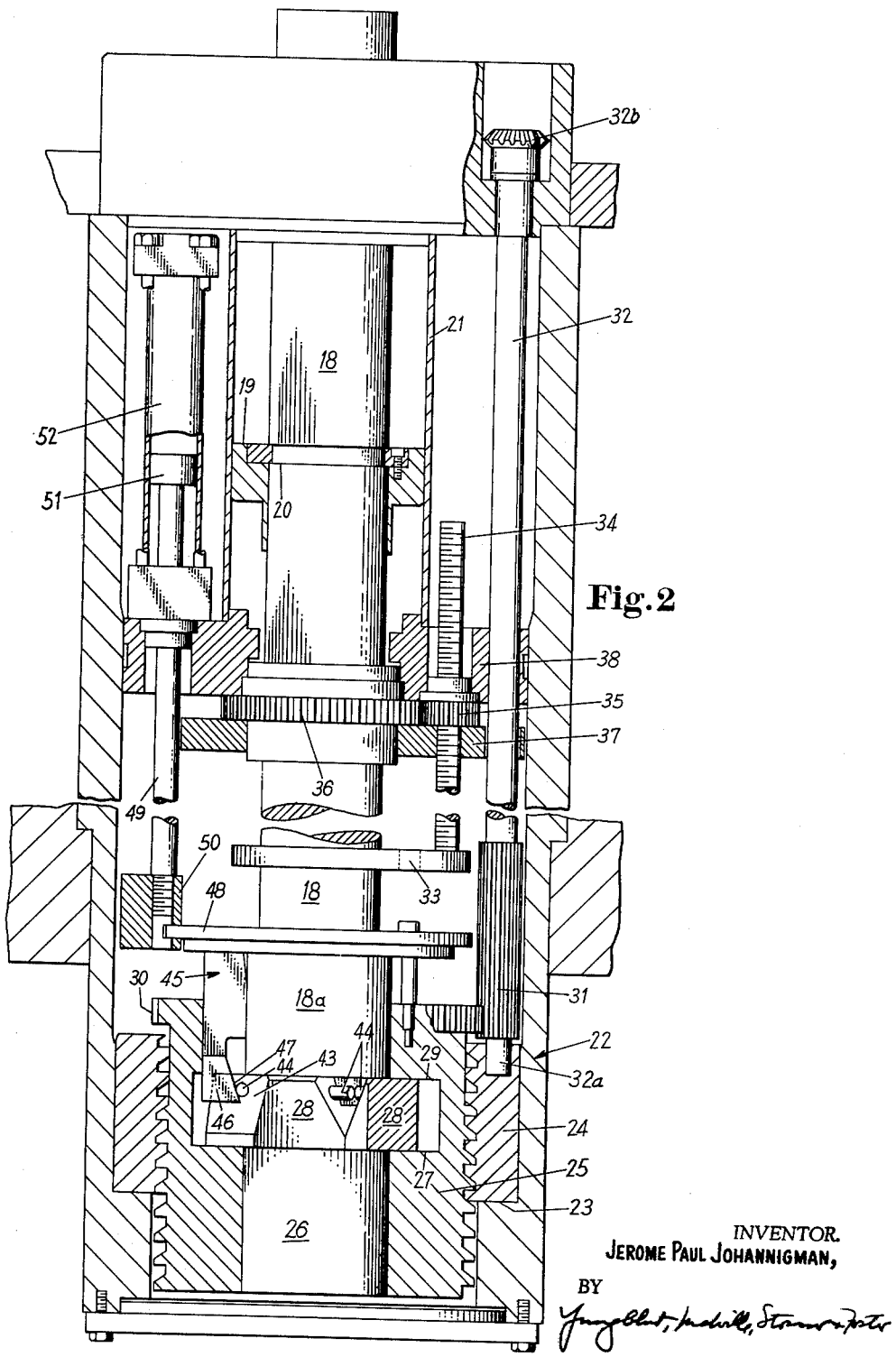
FIG. 2 is a cross-sectional view through the apparatus showing the general arrangement of parts.

Referring now in more detail to FIG. 2, the core punch 18 is shown as having an enlarged bottom portion 18a. The core punch has secured to it, by means of a split ring or the like 20, the piston 19 which operates in the cylinder 21. Means (not shown) are provided for supplying fluid under pressure either above or below the piston 19 to cause the core punch 18 to be raised or lowered. The apparatus being described is contained within a casing indicated generally at 22 and it will be seen that in the lower portion thereof a shoulder 23 is provided and an internally threaded sleeve 24 is press fitted into the casing 22 bearing upon the shoulder 23. An externally threaded member 25 having threads engaging the threads in the member 24 is in threaded engagement with the member 24 and has a central bore 26 therethrough. It is also provided with an annular shoulder 27 on which the wedge blocks indicated generally at 28 may slide. The wedge blocks 28 are retained in position between the shoulder 27 and the shoulder 29 in what may be thought of as an annular recess in the member 25. In the position shown in FIG. 2, the core punch is resting on the wedge blocks 28 to define the position of any stepped configuration of the core punch at the end of the compacting operation.

It will be seen that the member 25 is provided with the ring gear 30 which is in engagement with an elongated pinion 31 mounted on the pinion shaft 32. The lower end 32a of the pinion shaft has a bearing in the member 24. The upper end of the pinion shaft may be provided with a bevel gear 32b which may mesh with another bevel gear (not shown) for the adjustment of the position of the member 25. It will be understood that if the pinion shaft 32 is caused to rotate, the pinion 31 transmits rotation to the ring gear 30 thus rotating the member 25 and causing it to be screwed upward or downward with respect to the member 24. This is purely a bottom stop adjustment.

Figure 1:
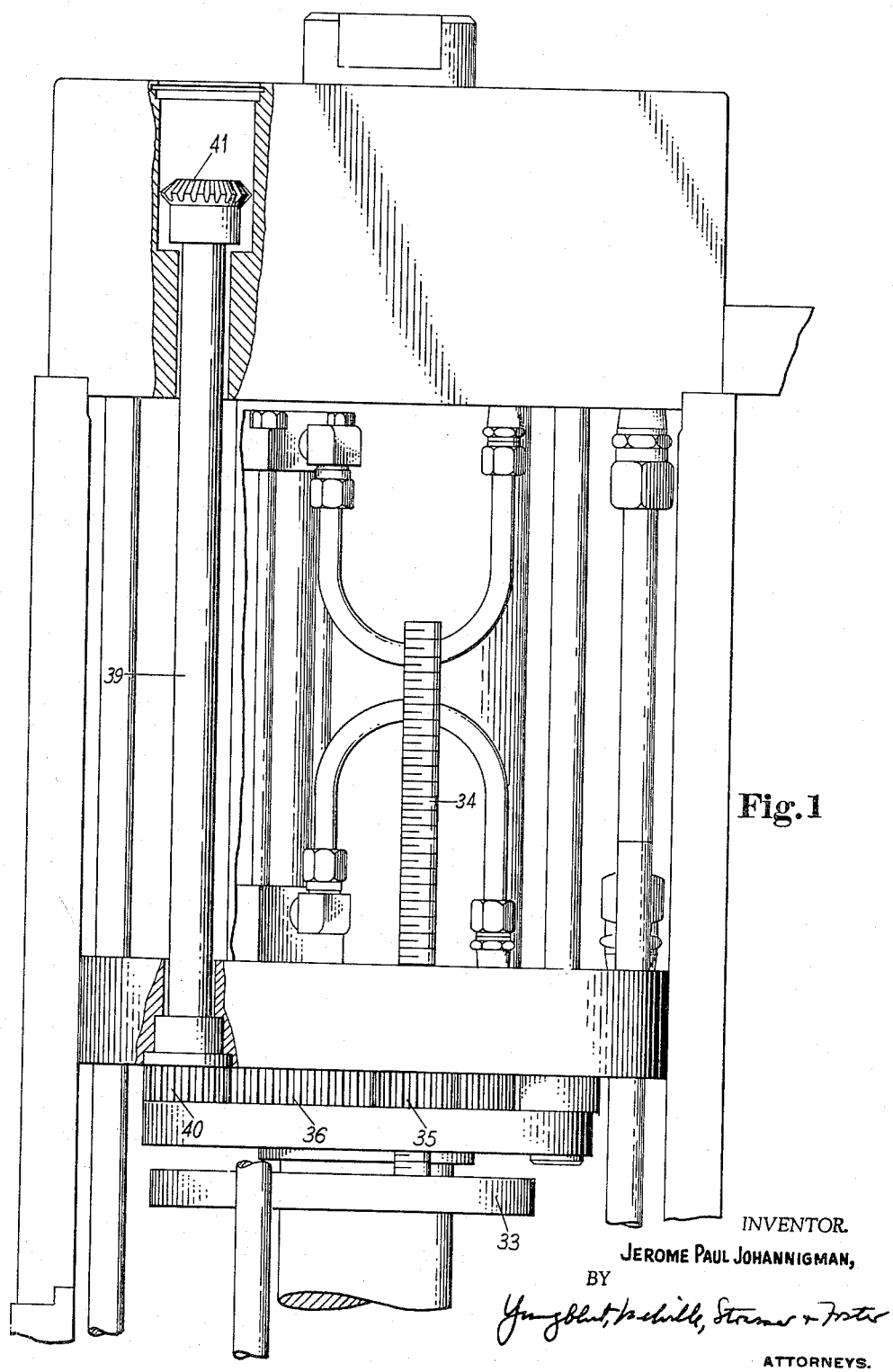
FIG. 1 is a fragmentary elevational view with parts broken away of an apparatus according to the invention.

To limit the upward movement of the core punch, which movement takes place when the powdered material loosely fills the die cavities, a stop plate 33 is provided. The position of this plate is also adjustable. Secured to the stop plate 33 are a plurality of screws 34 which are threaded through pinions 35. (Since there are preferably three of these screws 34 and pinions 35, it will be understood that only one can be seen in FIG. 2.) The three pinions 35 mesh with a ring rear 36 confined to a fixed horizontal plane between a retaining plate 37 and the piston head 38. By reference to FIG. 1, it will be seen that a pinion shaft 39 is provided carrying a pinion 40 arranged to engage and mesh with the ring gear 36. The pinion shaft at its upper end may be provided with a bevel pinion 41 so that by means of a mating bevel gear (not shown) rotation may be imparted to the pinion 39. Rotation of the shaft 39 through the pinion 40 produces rotation of the ring gear 36 which in turn produces rotation of the several pinions 35, so that by the coaction of the internal threads in the pinions 35 with the adjusting screws 34, the plate 33 may be raised or lowered.

Figure 3:
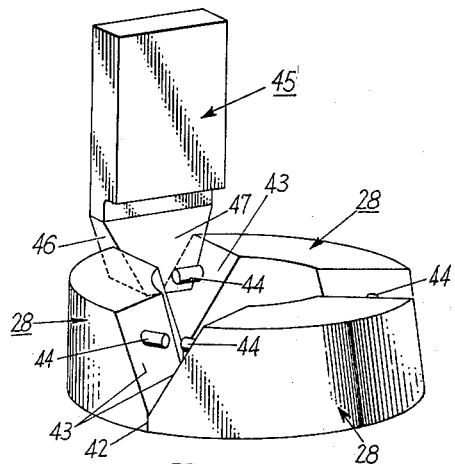
FIGS. 3 and 4 are perspective views of the stop members and one of the wedge blocks showing the relationship of the parts with the stop in operative position and in open position respectively.
Figure 4:
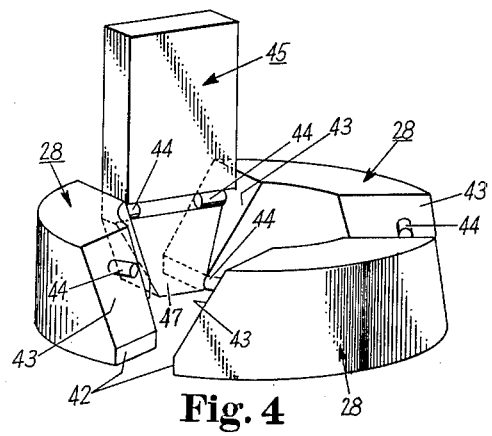

Turning now to a more detailed showing of the stop mechanism proper, reference may be had to FIGS. 3 and 4. In this particular embodiment, three wedge blocks 28 are shown. In the position of FIG. 3 the wedge blocks at the bottom form a complete circle and the surfaces 42 of the respective blocks are in contact with each other. The major portions of the mutually opposed faces of the segments slope as indicated at 43 and it will be seen that in the closed position of FIG. 3, V-shaped upwardly open notches are presented. From each face 43 there projects a pin 44.

The means for moving the wedge blocks apart to the position of FIG. 4 and returning them to the position of FIG. 3 comprise three wedge blocks, one of which is indicated generally at 45. The lower ends of the blocks 45 and the inwardly sloping surfaces 46 are parallel to the aforementioned sloping surfaces 43, so that as the wedge blocks move downwardly from the position of FIG. 3 to the position of FIG. 4, they force the segments 28 apart to the position of FIG. 4. In this position, it will be understood that the inner surfaces of the wedge blocks will have been withdrawn radially to the point that the member 18a may pass downwardly through the segmented ring and into the bore 26.

To return the wedge blocks to the position of FIG. 3, the inwardly facing surface 47 of each wedge block is formed as an inwardly extending cam. This cam passes beneath the pins 44 so that as the wedge blocks 45 move upwardly from the position of FIG. 4 to that of FIG. 3, the coaction between the cam surfaces 47 of the wedge blocks and the pins 44 pushes the blocks 28 radially inward into the position of FIG. 3.

Referring back to FIG. 2, the several wedge blocks 45 are secured to a pusher plate 48 and the pusher plate is actuated by three push rods 49 which have the blocks 50 secured to their lower ends. The pusher plate is secured to the blocks 50. The push rods 49 are secured to the pistons 51 operating in the cylinders 52. Again it will be understood that means are provided for supplying fluid under pressure selectively above or below the pistons 51 to cause them to move upwardly or downwardly.

Referring now to FIGS. 5 to 14 inclusive, these are similar to FIGS. 5 to 14 in said copending application and reference may be had to said application for the operation of the floating dies, the filling mechanism and the like. These do not form a part of the present invention and will not be described in detail. In the present application, it is the operation of the piston 19 in the cylinder 21 which will be described. In these drawings there is also shown one of the cylinders 52 and its piston 51. The cylinders 21 and 52 are connected in parallel, i.e. fluid may be supplied through the line 53 to the upper ends of the cylinders 21 and 52 above the pistons 19 and 51 or it may be supplied through the line 54 to both cylinders below the respective pistons. A valve is shown diagrammatically at 55 which is simply a reversing valve, so that with the valve in the position of FIG. 5 pressure is applied to the upper ends of the cylinders 21 and 52 and in the position of FIG. 8 pressure is applied to the lower ends of the cylinders 21 and 52 beneath the pistons 19 and 51.

In FIG. 5 the workpiece 60 is shown in its completely ejected position. As disclosed in the copending application referred to, all of the floating dies have been depressed to be in a common plane to eject the workpiece externally and the core punch 18 has been withdrawn to eject the workpiece internally. In FIGS. 5 to 14 inclusive the die in the upper platen is indicated at 90, the die in the intermediate platen at 91, and the die in the lower platen at 92. The fixed bottom punch is indicated at 17. These reference numerals correspond to those used in the said Belden application, Serial No. 221,840, referred to above. In FIG. 6 the completed workpiece 60 has been pushed aside and a filling device 61 has been moved into position over the dies. During this time pressure is being applied on top of the pistons 19 and 51. In FIG. 7 the various die platens have been moved upwardly for filling and the powdered material 62 is shown loosely filling the die cavity. In FIG. 8, the valve 55 has been shifted to apply pressure beneath the pistons 19 and 51 and the core punch 18 has been forced upwardly to the point where the shoulder between the portions 18 and 18a of the core punch has abutted the stop plate 33. At the same time the auxiliary pistons 51 have been moved upward to close the stop comprising the segmented ring 28. In should be noted that FIGS. 5 to 14 inclusive are small scale diagrams, and for clarity, the shoulder between the portions 18 and 18a of the core punch, and the stop plate 33 against which said shoulder abuts, as well as the wedge blocks 28, have been omitted from these figures. These parts are fully disclosed and their functions explained, in connection with FIGURES 2, 3 and 4. In FIG. 9 the apparatus is shown in condition to begin the compacting operation. The compacting operation proceeds as shown in FIGS. 10 and 11, with the various die platens floating downwardly and with the core punch also floating downwardly until the portion 18a thereof comes to rest on the segmental blocks 28 which constitute the bottom stop. This defines the position of the step 63 in the core punch and the parts remain in this position until compacting is completed in FIG. 11. At this point, the die platens are forced downwardly, as described in said copending application, to eject the uppermost external step of the workpiece, as shown in FIG. 12. At this point, the reversing valve 55 is shifted to supply pressure above the pistons 19 and 51 and as a result of pressure above the pistons 51, the pusher plate 48 and its associated wedge blocks 45 are pushed downwardly to spread apart the ring segments 28. The main piston 19, however, does not move downwardly because the friction between the core punch and the workpiece is still too great.

In FIG. 13, the second external step of the workpiece has been ejected and in FIG. 14 the last step of the workpiece has been externally ejected. Somewhere between the positions of FIGS. 13 and 14, the pressure on the upper side of the piston 19 will overcome the frictional resistance of the core punch within the workpiece and the core punch will descend through the opened stop to the position of FIG. 14. At this point, the cycle has been completed.

It will be clear that various modifications may be made without departing from the spirit of the invention and therefore no limitation is intended which is not expressly set forth in the claims which follow.

What is claimed is:

1. In a compacting press having a die, a core punch and a fixed bottom punch, and a fluid piston secured to said core punch and operating in a fluid cylinder, and means for supplying fluid pressure to said cylinder selectively above said piston to eject said core punch from said die, and below said piston to project it thereinto; an adjustable positive bottom stop to stop said piston intermediate its stroke, to hold said core punch in a desired projected position during the compacting and external ejection operations on a workpiece, and means to release said bottom stop upon completion of external ejection, to permit said piston to complete its stroke, whereby said core punch may be ejected from said workpiece by fluid pressure above said piston.

2. Apparatus according to claim 1, wherein said bottom stop comprises a segmented ring having an internal diameter smaller than the bottom of said core punch, and said releasing means comprises means for moving the segments of said ring radially outward to a point where the bottom of said core punch may pass therethrough.

3. Apparatus according to claim 2, wherein the mutually opposed faces of the segments of said ring slope toward each other from the top downward, to provide a number of upwardly open V-shaped notches, and said releasing means comprises an equal number of downwardly directed wedge members entering into the respective notches, and means for moving said wedge members downwardly concurrently to force said ring segments apart.

4. Apparatus according to claim 3, wherein said wedge members are formed with an inwardly directed cam surface, and each of said ring segments is provided on said sloping faces with a projecting pin adapted to engage the respective cam surfaces, said cam surfaces extending inwardly beneath said pins, and means to move said wedge members upwardly concurrently, whereby the coaction of said cam surfaces and said pins moves said ring segments radially toward each other to operative stop position.

5. Apparatus according to claim 3, wherein all of said wedge members are secured to a ring surrounding said core punch, and wherein a plurality of fluid cylinders is disposed about said core punch, each of said cylinders having a piston, and all of said pistons being secured to said ring.

References Cited by the Examiner
UNITED STATES PATENTS

| | | | |
|---|---|---|---|
| 474,496 | 5/92 | Crossley | 18—16.5 |
| 1,475,032 | 11/27 | Shrum et al. | |
| 2,338,491 | 1/44 | Cutler | 18—16.5 |
| 2,398,227 | 4/46 | Hubbert | 18—16.5 |
| 2,762,078 | 9/56 | Haller | 18—16.5 |
| 2,810,929 | 10/57 | Willi | 18—16.7 |

MICHAEL V. BRINDISI, *Primary Examiner.*

WILLIAM J. STEPHENSON, *Examiner.*